United States Patent
Ngo et al.

(10) Patent No.: US 6,879,455 B2
(45) Date of Patent: Apr. 12, 2005

(54) METHOD TO INCREASE HEAD VOLTAGE SWING AND TO REDUCE THE RISE TIME OF WRITE DRIVER

(75) Inventors: Tuan Van Ngo, Eden Prairie, MN (US); Raymond Elijah Barnett, Apple Valley, MN (US); Scott Gary Sorenson, Lakeville, MN (US)

(73) Assignee: Texas Instruments Incorporated, Dallas, TX (US)

(*) Notice: Subject to any disclaimer, the term of this patent is extended or adjusted under 35 U.S.C. 154(b) by 602 days.

(21) Appl. No.: 10/002,193

(22) Filed: Oct. 19, 2001

(65) Prior Publication Data

US 2003/0076613 A1 Apr. 24, 2003

(51) Int. Cl.[7] .................................................. G11B 5/02
(52) U.S. Cl. .............................. 360/68; 360/46; 360/67
(58) Field of Search ............................. 360/65–68, 46, 360/25; 327/110

(56) References Cited

U.S. PATENT DOCUMENTS 5,757,215 A * 5/1998 Schuelke et al. ........... 327/110
6,121,800 A * 9/2000 Leighton et al. ............ 327/110
6,166,869 A * 12/2000 Pidutti et al. ................. 360/46
6,175,463 B1 * 1/2001 Nayebi et al. ................ 360/68

* cited by examiner

Primary Examiner—Sinh Tran
Assistant Examiner—Varsha A. Kapadia
(74) Attorney, Agent, or Firm—W. Daniel Swayze, Jr.; W. James Brady; Frederick J. Telecky, Jr.

(57) ABSTRACT

A voltage-mode boosting write driver circuit (40) having a pair of voltage boosting PMOS transistor sets (44, 46) coupled to a high current H-switch (42). One set (44) of the boosting PMOS transistors correspondingly pulls output pin HY high, while the other transistor set (46) correspondingly pulls output pin HX high and the other output pin HY low thereby significantly improving the head voltage swing, and also achieving a faster slew rate. Moreover, resistors (R3, R4) of the H-switch are both matched to each other and impedance matched to a flex cable (T0) interconnection impedance, which interconnection is coupled to the thin film head, to thereby eliminate signal reflection such that the write current (Iw) settles quickly with minimum ringing to achieve a high data rate. Moreover, less power dissipation and smaller number of devices used are achieved by making use of existing transient currents of the pre-driver emitter follower stage.

20 Claims, 3 Drawing Sheets

METHOD TO INCREASE HEAD VOLTAGE SWING AND TO REDUCE THE RISE TIME OF WRITE DRIVER

FIELD OF THE INVENTION

The present invention is generally related to the field of mass media information storage devices, and more particularly to a voltage-mode boosting circuit to increase head voltage swing while reducing the rise time of a write driver current switch driving a thin film transducer.

BACKGROUND OF THE INVENTION

Hard disk drives are mass storage devices that include a magnetic storage media, e.g. rotating disks or platters, a spindle motor, read/write heads, an actuator, a pre-amplifier, a read channel, a write channel, a servo circuit, and control circuitry to control the operation of hard disk drive and to properly interface the hard disk drive to a host system or bus. FIG. 1 shows an example of a prior art disk drive mass storage system 10. Disk drive system 10 interfaces with and exchanges data with a host 32 during read and write operations. Disk drive system 10 includes a number of rotating platters 12 mounted on a base 14. The platters 12 are used to store data that is represented as magnetic transitions on the magnetic platters, with each platter 12 coupleable to a head 16 which transfers data to and from a preamplifier 26. The preamp 26 is coupled to a synchronously sampled data (SSD) channel 28 comprising a read channel and a write channel, and a control circuit 30. SSD channel 28 and control circuit 30 are used to process data being read from and written to platters 12, and to control the various operations of disk drive mass storage system 10. Host 32 exchanges digital data with control circuit 30.

Data is stored and retrieved from each side of the magnetic platters 12 by heads 16 which comprise a read head 18 and a write head 20 at the tip thereof. The conventional readhead 18 and writehead 20 comprise magneto-resistive heads adapted to read or write data from/to platters 12 when current is passed through them. Heads 16 are coupled to preamplifier 26 that serves as an interface between read/write heads 18/20 of disk/head assembly 10 and SSD channel 28. The preamp 26 provides amplification to the waveform data signals as needed. A preamp 26 may comprise a single chip containing a reader amplifier 27, a writer amplifier, fault detection circuitry, and a serial port, for example. Alternatively, the preamp 26 may comprise separate components rather than residing on a single chip.

In the preamplifier 26, the voltage at the output of the write driver circuit driving a thin film head via an external flex cable interconnection is limited by many constraints, such as supply voltages, head room in the circuitry, and the impedance of the external connection. If the write driver's output head voltage swing is increased, more voltage is delivered to the thin film head to saturate the media faster, which in turn allows the data to be written at a higher data rate.

There is a need for an improved voltage-mode write driver circuit that increases the write driver's output head voltage swing to achieve higher write data rates.

SUMMARY OF THE INVENTION

The present invention achieves technical advantages as a voltage-mode boosting write driver circuit including two sets of PMOS transistors, one set for voltage boosting each half of a high current H-switch driving a thin film head. One set of PMOS transistor includes one transistors which turns on hard to pull output pin HY up very fast towards Vcc, while the other transistor pulls up the base of one of the H-switch transistors to in turn pull down hard the output pin HX toward VEE. The simultaneous actions of pulling output pin HY up and output pin HX down quickly produces a larger differential voltage swing across the output HX and HY, resulting in faster slew rate of the write current output. Likewise, the other set of PMOS transistors associated with the other half of the H-switch are likewise coupled to the other half of the H-switch to pull down pin HY and pull up pin HX. Regardless of whether the differential input signal is positive or negative, the voltage differential across the output pins HX and HY always has a large differential voltage swing and a fast slew rate. Also, by using existing transient currents of the pre-driver to drive the PMOS devices, lower power dissipation and smaller number of devices used are achieved.

DETAILED DESCRIPTION OF THE PREFERRED EMBODIMENT

Figure 2:
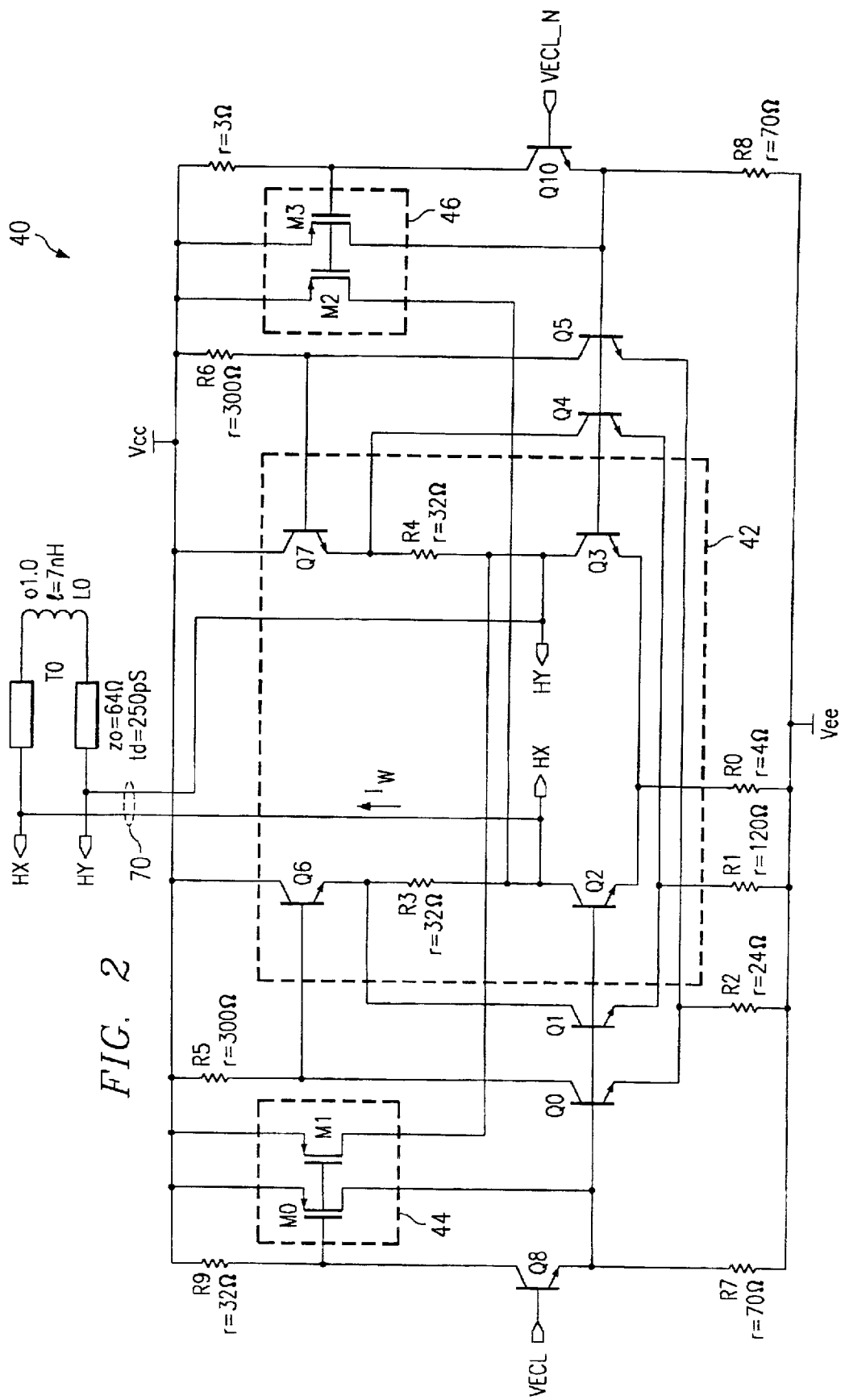
FIG. 2 depicts a voltage-mode boosting write driver circuit according to the present invention including two sets of PMOS transistors each coupled to the high-current H-switch and adapted to each pull high one output pin while simultaneously pulling low the other output pin to achieve a larger differential voltage swing.

FIG. 2 depicts a voltage-mode boosting write driver circuit 40 according to a preferred embodiment of the present invention. Circuit 40 of FIG. 2 achieves technical advantages by increasing the maximum head voltage swing while also reducing the rise time of the write driver current to driving a thin film head L0. The inputs of circuit 40 are the write data VECL and VECL_N pin. They are differential voltage signals with an ECL level swing of 200–300 mV differential. The differential outputs of circuit 40 are HX and HY, which drive the flex interconnection T0, connected to the thin film transducer L0. The typical values for a high end system (>1 Gb/s) of T0 and L0 are: Interconnection's differential input impedance of 64 Ohms and transmission delay of 250 psec, the thin film inductance of 7 nH. The typical supply voltages are: Vcc=+5V+/−10%, Vee=−5V+/−5% and ground.

Figure 4:
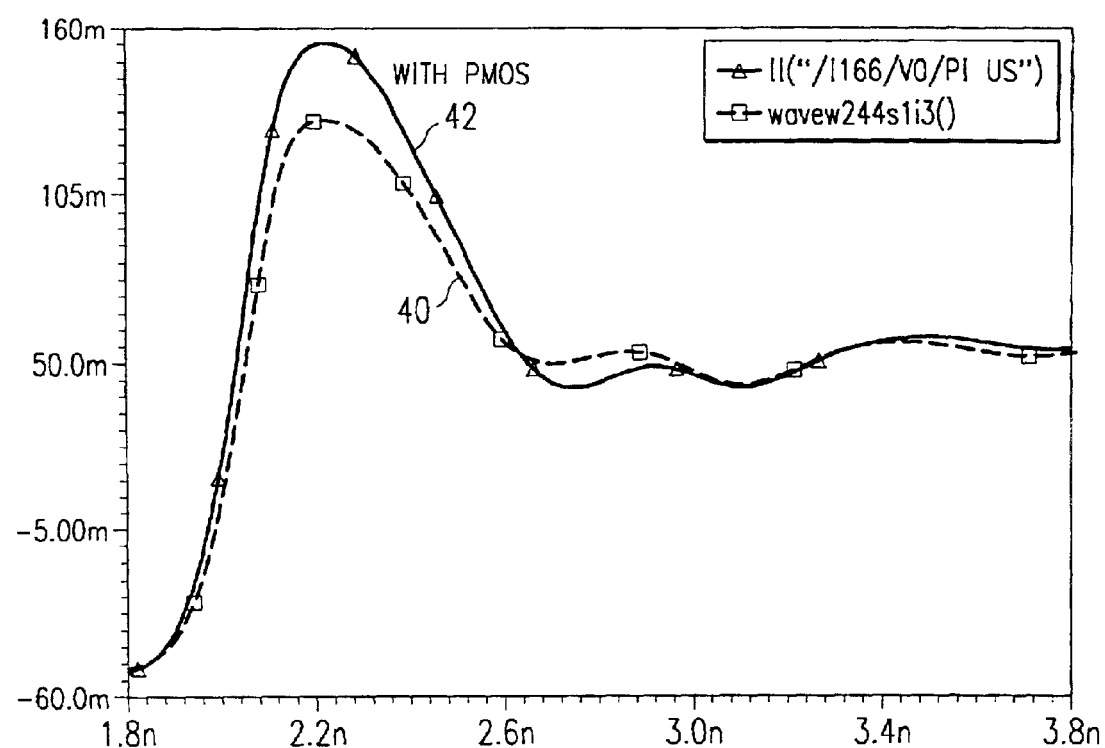
FIG. 4 illustrates both the increased voltage swing and a quicker settling of the drive signal achieved to the impedance matching of the H-switch to the thin film head and respective interconnection.

The main H-switch 42 switches the write current Iw and is composed of an upper pair of bipolar transistors Q6 and Q7, and a lower pair of bipolar transistors Q2 and Q3. Advantageously, resistors R3 and R4 are impedance-matched resistors and which together match the differential impedance of the interconnection T0. In the steady state, the differential output impedance of the write driver circuit 40 is 64 Ohms, which is matched to the interconnection T0 impedance being 64 Ohms. With no signal reflection occurring due to the matched impedances, the write current Iw settles quickly with minimum ringing to achieve high data rate, as shown in FIG. 4.

Operation

Assume the input VECL signal is high and input VECL_N signal is low with a differential logic level of 300 mV. Transistors Q8 and Q0–Q2 are on, and transistors Q10 and Q3–Q5 are off. The base of transistor Q6 is pulled down lower than the base of transistor Q7. Accordingly, most of the write current Iw will flow from the transistor Q2 collector, through the pin HX to the interconnection T0, and to the thin film head L0. The return current path is through resistor R4 and transistor Q7. Transistor Q6 is still on due to current provided by transistor Q1 which ensures that the resistors R3+R4=64 Ohms impedance matches the interconnection's impedance.

Figure 1:
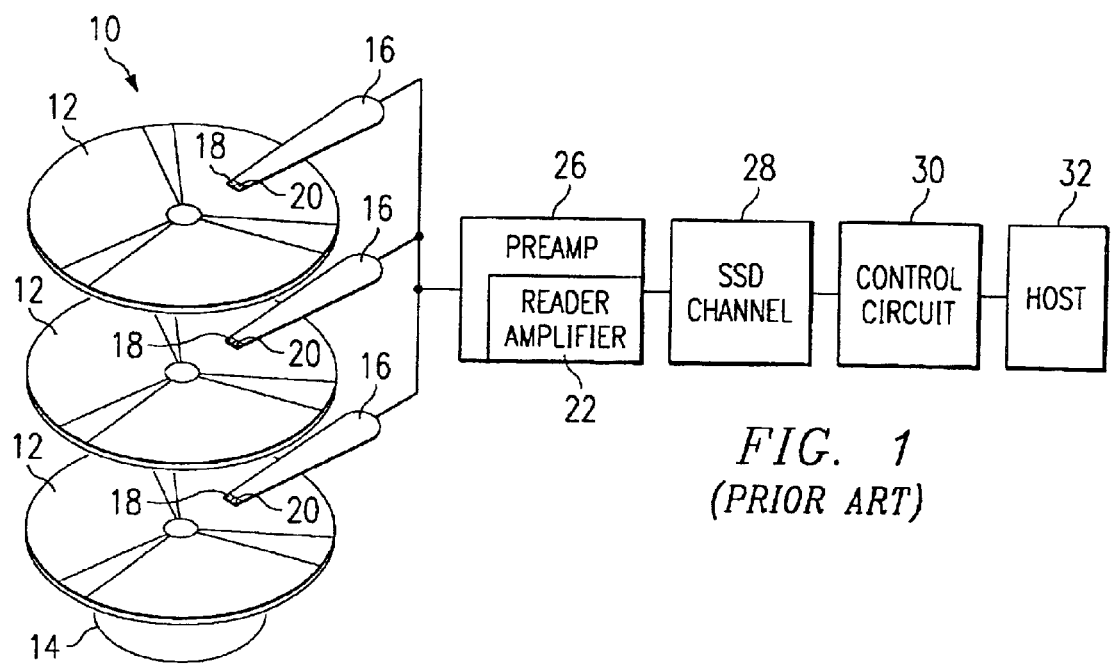
FIG. 1 illustrates a conventional disk drive system including multiple rotating disks or platters, read/write heads, a piezo actuator, a servo circuit, and associated amplifier and control circuitry.
Figure 3:
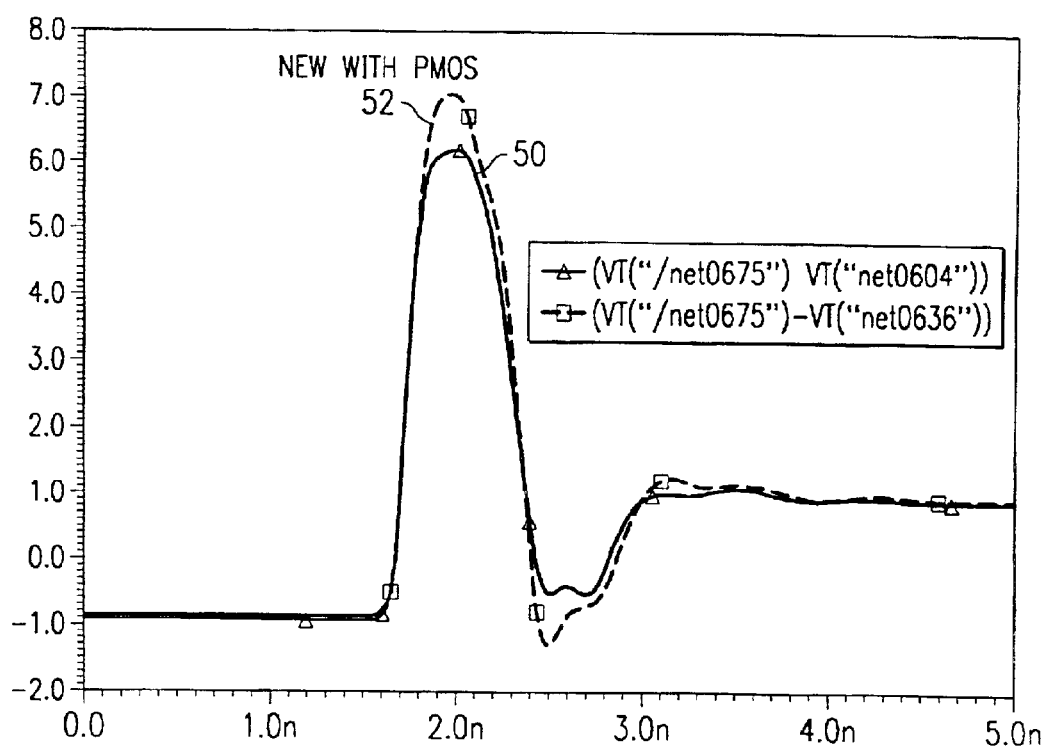
FIG. 3 is a waveform diagram illustrating the increased differential voltage swing across outputs pins HX and KY, and also resulting in a faster slew rate.

According to the present invention, when the input voltage signal switches from low to high, transistor Q8 produces a very high transient current of 50–60 mA in a very short period of time. This produced transient current responsively pulls down both the gates of the PMOS transistors M0 and M1, collectively shown at 44, and turns them on very hard. PMOS transistor M1 turning on hard responsively pulls the output pin HY up very fast toward Vcc, while PMOS transistor M0 pulls up the bases of transistor Q0–Q2 and thus responsively pulls output pin HX down hard toward Vee. The simultaneous actions of quickly pulling pin HY up and pin HX down produces a larger differential voltage swing output at HX and HY, as shown in FIG. 3. The result is faster slew rate of the write current output.

Likewise, the second pair 46 of PMOS transistors M2 and M3 are coupled to the right half of the H-switch 42. When the input voltage signal switches from high to low, transistor Q10 produces a very high transient current of 50–60 mA in a very short period of time. This produced transient current responsively pulls down both the gates of the PMOS transistors M2 and M3, collectively shown at 46, and turns them on very hard. PMOS transistor M2 turning on hard responsively pulls the output pin HX up very fast toward Vcc, while the PMOS transistor M3 pulls up the bases of transistor Q3–Q5 and thus pulls down the output HY hard toward Vee. The simultaneous action of quickly pulling pin HX up and pin HY down produces a larger differential voltage swing across the outputs HX and HY, as shown at 52 in FIG. 3, as opposed to the differential swing 50 without the PMOS boosting transistors 44 and 46.

As depicted in FIG. 2, the additional pairs of boosting PMOS transistors 44 and 46 significantly increase the voltage swing across the output pins HX and HY, wherein the voltage swing is shown at 50 without the use of the sets of PMOS transistors 44 and 46, and depicted at 52 when including the sets of boosting PMOS transistors 44 and 46. In the case when Vcc is +5 volts, and Vee is −5 volts, there is seen in FIG. 3 an increase voltage swing of approximately 0.9 volts, which is roughly a 15% increase in the differential voltage swing, which is very significant. This additional voltage swing also has an increased slew rate of the output voltage signal, as also depicted in FIG. 3, due to the impedance matching of the H-circuit 42 to the interconnection T0 and head L0.

FIG. 4 further depicts that the write current Iw settles quickly and with minimum ringing due to the impedance matching of the H-switch resistors R3 and R4 to the impedance of the flex cable interconnection, thereby achieving a higher write data rate.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A write driver circuit having a differential signal input, comprising:
   a write head;
   an H-switch having a first and second transistor with a first node defined therebetween, and a third and fourth transistor with a second node defined therebetween, wherein said first and second nodes are adapted to drive the write head;
   a first boosting transistor set coupled to said differential signal input adapted to pull said first node low and said second node high;
   a second boosting transistor set coupled to said differential signal input adapted to pull said first node high and said second node low; and
   a pre-driver including a fifth transistor coupled between said differential signal input and said H-switch first transistor, and a sixth transistor coupled between said differential signal input and said H-switch third transistor,
   wherein said fifth and sixth transistors transient currents during switching, wherein said transient currents drive said first and second boosting transistor set.

2. The write driver circuit specified in claim 1 wherein said first boosting transistor set includes at least one PMOS transistor.

3. The write driver circuit specified in claim 2 wherein said first boosting transistor set includes a first and second PMOS transistor.

4. The write driver circuit specified in claim 3 wherein said second boosting set includes a pair of PMOS transistors.

5. The write driver circuit specified in claim 1 further comprising a first resistor coupled between said first node and said second transistor, and a second resistor coupled between said second node and said fourth transistor, wherein the sum of said first and second resistor resistance is matched to an impedance of the write head.

6. The write driver circuit specified in claim 5 wherein said first and second resistors are matched.

7. The write driver circuit specified in claim 1 wherein said first and second boosting transistor sets are adapted to create both a larger voltage swing and a faster slew rate at said first and second node from that produced by the circuit without said first and second boosting transistor sets.

8. A write driver circuit having a differential signal input, comprising:
   a write head;
   an H-switch having a first and second transistor with a first node defined therebetween, and a third and fourth transistor with a second node defined therebetween, wherein said first and second nodes are adapted to drive the write head;
   a first boosting transistor set coupled to said differential signal input adapted to pull said first node low and said second node high; and
   a second boosting transistor set coupled to said differential signal input adapted to pull said first node high and said second node low,
   wherein said first boosting transistor set includes a first and second PMOS transistor; and wherein said first and second PMOS transistors are coupled in parallel.

9. The write driver circuit specified in claim 8 wherein said first PMOS transistor is coupled to said second node, and said second PMOS transistor is coupled to the H-switch first transistor.

10. The write driver circuit specified in claim 9 wherein the H-switch is disposed between an upper and lower voltage rail, the first transistor has a base, and wherein said second PMOS transistor is adapted to pull said first transistor base toward said upper voltage rail and said first node toward said lower voltage rail.

11. The write driver circuit specified in claim 10 wherein said first PMOS transistor is adapted to pull said second node toward said upper voltage rail.

12. A method of increasing a slew rate and voltage swing at a first and second output of an H-switch adapted to drive a write head, comprising the step of:
utilizing a set of boosting transistors coupled to the H-switch to increase a pull-up voltage at the first output while simultaneously increasing a pull-down voltage at the second output; and
using a pre-driver to drive said H-switch, wherein transient currents of said pre-driver drive said boosting transistors.

13. The method as specified in claim 12 wherein the boosting transistors comprise a pair of PMOS transistors.

14. The method as specified in claim 13 wherein a first of the boosting transistors is coupled to one half of the H-switch, and a second boosting transistor is coupled to the other half of the H-switch.

15. The method as specified in claim 14 wherein the first boosting transistor pulls the second output up while the second boosting transistor drives the respective half of the H-switch harder to responsively pull down the first output.

16. The method as specified in claim 12 further comprising the step of matching the output impedance of the H-switch to an impedance of the write head driven by the first and second output.

17. A write driver circuit having a differential signal input, comprising:
an H-switch having a first and second transistor with a first node defined therebetween, and a third and fourth transistor with a second node defined therebetween, wherein said first and second nodes are adapted to drive a write head;
a first boosting transistor coupled to said differential input adapted to pull said first node low and said second node high; and
a second boosting transistor coupled to said differential input adapted to pull said first node high and said second node low,
wherein the H-switch is disposed between an upper and lower voltage rail, the first transistor has a base, and wherein said second boosting transistor is adapted to pull said first transistor base toward said upper voltage rail and said first node toward said lower voltage rail.

18. The write driver circuit specified in claim 17 wherein said first boosting transistor is adapted to pull said second node toward said upper voltage rail.

19. A write driver circuit having a differential signal input, comprising:
an H-switch having a first and second transistor with a first node defined therebetween, and a third and fourth transistor with a second node defined therebetween, wherein said first and second nodes are adapted to drive a write head;
a first boosting transistor coupled to said differential input adapted to pull said first node low and said second node high;
a second boosting transistor coupled to said differential input adapted to pull said first node high and said second node low, and
a pre-driver coupled to said H-switch, wherein said pre-driver has transient currents driving said first and second boosting transistors.

20. The write driver circuit specified in claim 19 wherein said first and second boosting transistors comprise PMOS devices.

* * * * *